(12) United States Patent
Becker et al.

(10) Patent No.: US 7,539,149 B2
(45) Date of Patent: May 26, 2009

(54) APPARATUS AND METHOD FOR PLACING POWER CONTROL DATA IN A TRANSMISSION SIGNAL

(75) Inventors: Burkhard Becker, Ismaning (DE); Patrick Feyfant, Golfe Juan (FR); Markus Doetsch, Schliern (CH); Peter Jung, Otterberg (DE); Jörg Plechinger, München (DE); Peter Schmidt, Ellerstadt (DE); Michael Schneider, München (DE); Tideya Kella, München (DE)

(73) Assignee: Infineon Technologies AG, Munich (DE)

( * ) Notice: Subject to any disclaimer, the term of this patent is extended or adjusted under 35 U.S.C. 154(b) by 302 days.

(21) Appl. No.: 11/507,252

(22) Filed: Aug. 21, 2006

(65) Prior Publication Data

US 2006/0280148 A1 Dec. 14, 2006

Related U.S. Application Data

(60) Division of application No. 10/139,171, filed on May 6, 2002, now Pat. No. 7,110,369, which is a continuation of application No. PCT/DE99/03538, filed on Nov. 4, 1999.

(51) Int. Cl.
*H04L 12/56* (2006.01)
*H04B 7/216* (2006.01)

(52) U.S. Cl. .......... 370/252; 370/278; 370/328
(58) Field of Classification Search .......... 370/278, 370/328, 329, 252; 455/422
See application file for complete search history.

(56) References Cited

U.S. PATENT DOCUMENTS

| 5,987,333 A | 11/1999 | Sole |
| 6,594,630 B1 | 7/2003 | Zlokarnik et al. |
| 2008/0181170 A1* | 7/2008 | Branlund et al. ............ 370/328 |

FOREIGN PATENT DOCUMENTS

| EP | 0 893 889 A2 | 1/1999 |
| WO | WO 95/24773 | 9/1995 |

* cited by examiner

*Primary Examiner*—John Pezzlo
(74) *Attorney, Agent, or Firm*—Laurence A. Greenberg; Werner H. Stemer; Ralph E. Locher

(57) ABSTRACT

A device for placing power control data in a transmission signal has: a generating device for generating power control data as a function of a received signal, a buffer for buffering a formatted transmission data word that contains a power control data field for recording power control data, an inserting device for inserting the generated power control data into the power control data field of the buffered transmission data word, and a modulation device for modulating the transmission data word to form a transmission signal with a transmission power corresponding to the power control data.

18 Claims, 2 Drawing Sheets

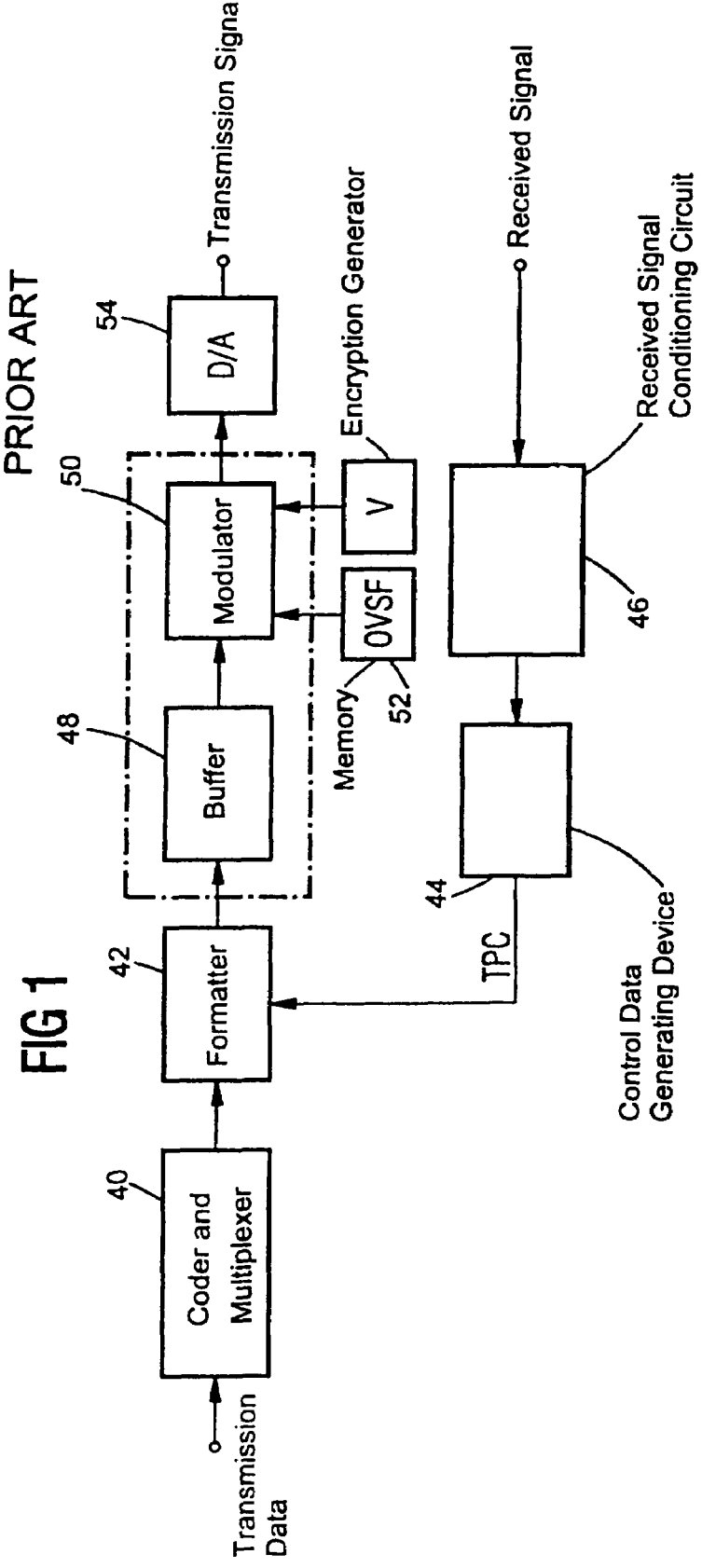

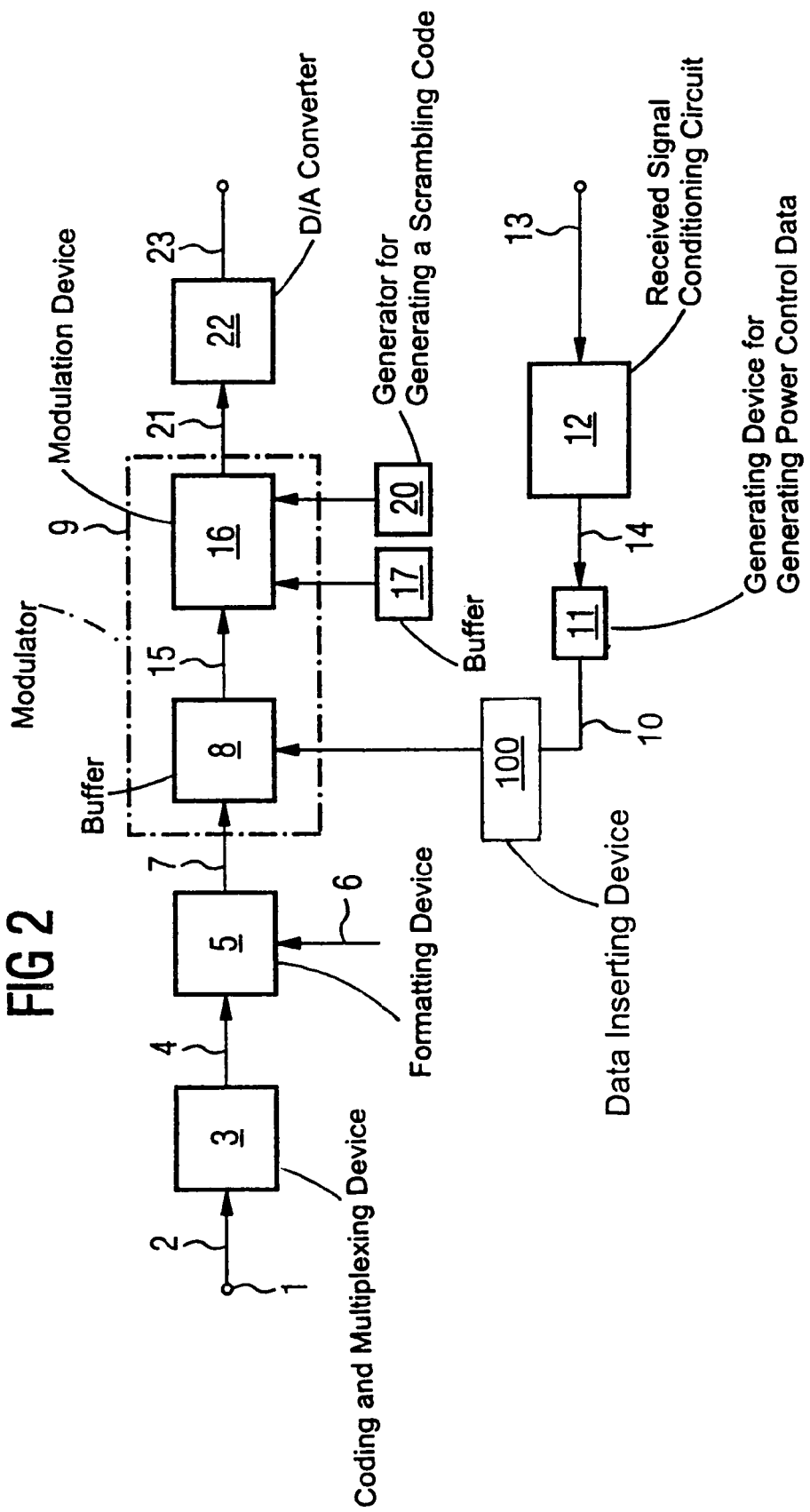

APPARATUS AND METHOD FOR PLACING POWER CONTROL DATA IN A TRANSMISSION SIGNAL

CROSS-REFERENCE TO RELATED APPLICATIONS

This is a division of application Ser. No. 10/139,171, filed May 6, 2002; which was a continuing application, under 35 U.S.C. §120, of International application PCT/DE99/03538, filed Nov. 4, 1999; the prior applications are herewith incorporated by reference in their entirety.

BACKGROUND OF THE INVENTION

Field of the Invention

The invention relates to an apparatus and method for placing power control data in a transmission signal, in particular in the form of a CDMA (Code Division Multiple Access) transmission signal.

In mobile radio systems, mobile radio stations MS communicate with a base station BS. Since the number of the mobile stations simultaneously communicating with a base station is high, the transmission power of a transmission signal must be controlled both in the case of the mobile station MS and in the case of the base station BS so that transmission signals of different stations do not interfere with one another.

CDMA (Code Division Multiple Access) is a channel access method that is used in cellular mobile radio systems. In CDMA mobile radio systems, a plurality of subscribers, which differ from one another only by an orthogonal subscriber-specific spread signal code applied to the transmission signal, transmit simultaneously in the same frequency band. A separation of the different subscribers is achieved by backspreading by using the respective subscriber-specific orthogonal code. However, received signals are no longer completely orthogonal because of the real mobile radio channel. In order to permit separation of the signals, it is therefore necessary for the various received signals to arrive at the receiver with approximately the same transmission power, since otherwise the desired signals are so strongly disturbed by interference with the transmission signals of other subscribers that separation is no longer possible.

CDMA mobile radio systems therefore require a particularly fast power control of the transmission signal both in the mobile radio station MS and in the base station BS.

The power control of the respective transmitter of a station is performed by power control data that are obtained from the received signal of that station with which the relevant station is communicating. The power of the transmission signal of the base station BS for a specific subscriber is controlled via a power control signal TPC of the mobile station MS. Conversely, the power of the transmission signal of the mobile station MS is controlled by the power control signal TPC transmitted by the base station BS. The generation of the respective control data in a station is performed in this case by evaluating the total signal received by the station by means of a signal-to-interference plus noise ratio estimate, that is to say what is termed an SINR estimate.

FIG. 1 shows a prior art apparatus for inserting power control data.

The transmission data to be transmitted by the station are fed to a coder and multiplexer 40. The coded and multiplexed transmission data are formatted in a formatter into a transmission data word with a plurality of data fields. The transmission data word in this case has a length of one time slot of the mobile radio system. The data fields serve to record information data, pilot data, formatting data and power control data TPC.

The power control data TPC are obtained in a control data generating device 44 by an SINR estimation of a received signal that has been conditioned by a received signal conditioning circuit 46. All data that are to be transmitted within a time slot of the mobile radio system, such as information data, pilot data, formatting data and the power control data TPC, are put together in the formatter 42. The formatting is undertaken, for-example, in a DSP processor or microcontroller. The finally formatted transmission data word is transmitted via a signal interoffice trunk, for example a BUS, into an input buffer 48 of a modulator 50. The input buffer 48 usually has a memory capacity that corresponds to the data length of two time slots or two transmission data words. The modulator 50 conditions the transmission data word stored in the input buffer 48 for signal transmission. For this purpose, it uses orthogonal OVSF codes that are stored in a memory 52 to carry out spreading in a CDMA mobile radio system. Furthermore, encryption or scrambling is performed with encryption codes that are generated by an encryption generator V. The transmission signal is subsequently generated by digital-to-analog conversion by a downstream D/A converter 54.

As may be seen from FIG. 1, a delay time interval that corresponds to the memory capacity of the buffer 48 exists between the instant at which the power control data TPC are generated for control on the basis of an interference plus noise ratio estimate, and the instant at which the power control data TPC are conditioned by the moderator 50 for transmission. Particularly in the case of CDMA mobile radio systems that require a particularly fast power control, such a long reaction time until the power control data TPC are transmitted after the SINR evaluation can lead to a substantial worsening of the signal transmission because of interference with transmission signals from other subscribers.

Published European Patent application EP 0 893 889 A2 discloses a method and an apparatus for controlling the transmission power in a CDMA communications system. On the basis of an SINR estimate, a TPC signal is generated and fed to what is termed a level controller, which generates power control data that are then inserted by what is termed the time multiplexer into the power control data field of the buffered transmission data word. The apparatus also has a modulation device for modulating the transmission data word to form a transmission signal with a transmission power corresponding to the power control data.

SUMMARY OF THE INVENTION

It is accordingly an object of the invention to provide an apparatus and method for placing power control data in a transmission signal which overcomes the above-mentioned disadvantages of the prior art apparatus of this general type.

In particular, it is an object of the invention to provide an apparatus for placing power control data in a transmission signal such that the transmission power of the station can be quickly controlled.

With the foregoing and other objects in view there is provided, in accordance with the invention, an apparatus for placing power control data in a transmission signal. The apparatus includes: a generating device for generating power control data as a function of a received signal, a buffer for buffering a formatted transmission data word that contains a power control data field for recording power control data, an inserting device for inserting the generated power control data into the power control data field of the buffered transmission data word, and a modulation device for modulating the transmission data word to form a transmission signal whose transmission power is controlled by the power control data.

In accordance with an added feature of the invention, the transmission signal is a CDMA transmission signal.

The generating device for generating transmission power control data generates the transmission power control data preferably using a signal-to-interference plus noise ratio estimate of the received signal.

In accordance with an additional feature of the invention, the formatting device formats coded and multiplexed transmission data into a formatted transmission data word.

The formatted transmission data word preferably consists of a plurality of data fields.

The length of the formatted transmission data word is preferably identical to the length of the CDMA time slot.

The power control data field of the formatted transmission data word is filled with predetermined filler data in the formatter in a preferred embodiment.

The filler data are preferably designed such that they effect no change in the transmission power.

The formatting device is preferably connected to the buffer via a signal bus.

In accordance with another feature of the invention, the modulation device is a digital modulator, and a digital-to-analog converter is connected downstream of the digital modulator.

Other features which are considered as characteristic for the invention are set forth in the appended claims.

Although the invention is illustrated and described herein as embodied in an apparatus and method for placing power control data in a transmission signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a prior art apparatus for inserting power control data; and

FIG. 2 shows an inventive apparatus for implementing power control data in the form of a transmission signal.

DESCRIPTION OF THE PREFERRED EMBODIMENTS

Referring to FIG. 2, it can be seen that the transmission data to be transmitted by the station pass, via a transmission data input 1 of the inventive power controller and a data line 2, to a coding and multiplexing device 3. The coded transmitted data are fed via an internal line 4 to a formatting device 5. The formatting device 5 formats the coded transmission data into formatted transmission data words. The formatted transmission data words respectively include a plurality of data fields that contain information data, pilot data, and formatting data. Moreover, the transmission data words respectively have a power control data field that is reserved for recording power control data. The power control data field of the formatted transmission data word is filled with filler data, for example, a sequence of binary zeros obtained via a line 6. The filler data are such that they cause no change in the transmission power. The formatting device 5 outputs the formatted transmission data words to an input buffer 8 of the modulator 9, via signal interoffice trunks 7 that form a signal bus, for example.

The buffer 8 is connected to a data inserting device 100 that receives power control data via a control line 10 from a generating device 11 for generating power control data. The generating device 11 for generating power control data preferably generates the power control data using a signal to interference plus noise ratio estimation or SINR estimation from a received signal that has been conditioned by a received signal conditioning circuit 12. The received signal received by the station is fed via a line 13 to the received signal conditioning circuit 12 and is conditioned there as a signal. The received signal conditioning circuit 12 contains a plurality of stages such as filters, analog-to-digital converters, pulse shapers RRC, rake circuits and an MRC circuit (Maximum Ratio Combining). The output of the signal conditioning circuit 12 is connected, via a line 14, to the generating device 11 for generating the power control data.

The power control data generated in the generating device 11 are written, via line 10 and the insertion device 100, directly into the power control data field of the transmission data word located in the buffer 8. The filler data are overwritten in the process. The transmission data word completed by the writing in of the power control data passes, via a line 15, to the actual modulation device 16 of the modulator 9. The modulation device 16 modulates the transmission data word. The spreading of the narrow band signal into a broadband signal is performed using an orthogonal OVSF code. The OVSF code is stored in a buffer 17 and is fed to the modulation device 16 via a line 18. Furthermore, the modulation device 16 receives an encryption or scrambling code for encrypting the transmission signal. The scrambling code is generated by a generator 20. The transmission signal modulated by the modulation device 16 is output, via a line 21, to a digital-to-analog converter 22 that generates an analog transmission signal. The analog transmission signal is output to a transmission antenna via a line 23.

The power control data pass directly into the modulator 9 without delay because of the fact that the power control data that are generated by the generating device 11 are written directly into the buffer 8 of the modulator 9. The reaction time of the power control, as it is shown in FIG. 2, with regard to changes in the received signal power of the signal received via the line 13 is thereby substantially shortened. This entails an improvement in the system performance. Power fluctuations in the received signal received from a different station are detected in a very short time by the power controller inside the relevant station, so that the latter can amplify or attenuate its own transmission signal correspondingly. The power control data or power control information data are thus transmitted substantially quicker in the case of the power regulation according to the invention. In this case, the input buffer 8 already present in the modulator 9 can be utilized to insert the power control data TPC.

We claim

1. An apparatus for placing power control data in a transmission signal, comprising:
    a first device that inserts coded transmission data into a formatted transmission data word having a power control data field for recording power control data, and that fills the power control data field with predetermined filler data;
    a second device that generates power control data as a function of a received signal;

a third device that changes the filler data word by inserting the power control data from said generating device into the power control data field of the formatted transmission data word.

2. The apparatus according to claim 1, further comprising a fourth device that buffers the formatted transmission data word.

3. The apparatus according to claim 1, further comprising a fifth device that modulates the formatted transmission data word to form a transmission signal with a transmission power corresponding to the power control data.

4. The apparatus according to claim 1, wherein the transmission signal is a CDMA transmission signal.

5. The apparatus according to claim 1, wherein said second device generates the power control data from the received signal using a signal-to-interference plus noise ratio estimate SINR.

6. The apparatus according to claim 1, wherein the formatted transmission data word includes a plurality of data fields.

7. The apparatus according to claim 1, wherein the formatted transmission data word has a length of a CDMA time slot.

8. The apparatus according to claim 2, further comprising a signal bus connecting said first device to said fourth device.

9. The apparatus according to claim 3, wherein said fifth device is a digital modulator.

10. The apparatus according to claim 3, further comprising a digital-to-analog converter connected downstream from said fifth device.

11. A method for placing power control data in a transmission signal, comprising:

inserting coded transmission data into a formatted transmission data word having a power control data field for recording power control data;

filling the power control data field with predetermined filler data;

generating power control data as a function of a received signal;

changing the filler data word by inserting the power control data from said generating device into the power control data field of the formatted transmission data word.

12. The method according to claim 11, wherein no change in a transmission power is caused when filling the power control data field with predetermined filler data.

13. The method according to claim 11, further comprising buffering the formatted transmission data word.

14. The method according to claim 11, further comprising modulating the formatted transmission data word to form a transmission signal with a transmission power corresponding to the power control data.

15. The method according to claim 11, wherein the transmission signal is a CDMA transmission signal.

16. The method according to claim 11, wherein the power control data is generated as a function of a received signal by using a signal-to-interference plus noise ratio estimate SINR.

17. The method according to claim 11, wherein the formatted transmission data word includes a plurality of data fields.

18. The method according to claim 11, wherein the formatted transmission data word has a length of a CDMA time slot.

* * * * *